(12) United States Patent
Chen et al.

(10) Patent No.: US 12,298,712 B2
(45) Date of Patent: May 13, 2025

(54) APPARATUS AND METHOD FOR MANUFACTURING RADIAL OR AZIMUTHAL POLARIZATION CONVERSION COMPONENT

(71) Applicant: FENG CHIA UNIVERSITY, Taichung (TW)

(72) Inventors: Jing Heng Chen, Taichung (TW); Chien Yuan Han, New Taipei (TW); Fan Hsi Hsu, Hsinchu (TW); Kun-Huang Chen, Taichung (TW); Chien Hung Yeh, Taichung (TW); Hung Lung Tseng, Taichung (TW)

(73) Assignee: Feng Chia University, Taichung (TW)

( * ) Notice: Subject to any disclaimer, the term of this patent is extended or adjusted under 35 U.S.C. 154(b) by 529 days.

(21) Appl. No.: 17/752,328

(22) Filed: May 24, 2022

(65) Prior Publication Data
US 2022/0382213 A1    Dec. 1, 2022

(30) Foreign Application Priority Data
May 25, 2021   (TW) .................. 110118903

(51) Int. Cl.
*G03H 1/04*      (2006.01)
*G02B 5/32*      (2006.01)
*G02B 27/28*     (2006.01)

(52) U.S. Cl.
CPC ............. *G03H 1/0402* (2013.01); *G02B 5/32* (2013.01); *G02B 27/286* (2013.01); *G03H 2001/0439* (2013.01); *G03H 2223/18* (2013.01)

(58) Field of Classification Search
CPC .. G03H 1/0248; G03H 1/0402; G03H 1/0404; G03H 1/30; G03H 1/0236; G03H 2001/005; G03H 2001/0094; G03H 2001/0415; G03H 2001/0439; G03H 2001/0495; G03H 2001/306;
(Continued)

(56) References Cited

U.S. PATENT DOCUMENTS 3,922,059 A * 11/1975 Noguchi .............. G02B 26/106
                                                359/17
3,970,357 A *  7/1976 Moraw .................... G03H 1/26
                                                359/22

(Continued)

OTHER PUBLICATIONS

Tseng et al (Recording of a holographic cylindrical vector beam converter with a truncated cone prism, Optics Letters, vol. 47, No. 15, Aug. 1, 2022, pp. 3888-3891). (Year: 2022).*

*Primary Examiner* — Jyotsna V Dabbi
(74) *Attorney, Agent, or Firm* — Rosenberg, Klein & Lee

(57) ABSTRACT

An apparatus for manufacturing a radial or azimuthal polarization conversion component includes a reflector having a truncated cone shape. The reflector has a top portion, a bottom portion, and a circumferential portion connected between the top portion and the bottom portion. When a light beam is incident vertically from above, a part of the light beam vertically passes through the top portion to the bottom portion, a part of the light beam enters the circumferential portion at an incident angle and forms a reflected light beam to enter the bottom portion at an incident angle, the reflected light enters the holographic recording material at a refraction angle to generate an exposure range.

6 Claims, 4 Drawing Sheets

(58) Field of Classification Search
CPC ........... G03H 2223/18; G03H 2223/24; G03H 2270/22; G03H 2240/15
USPC .......................................................... 359/30
See application file for complete search history.

(56) References Cited

U.S. PATENT DOCUMENTS

| | | | | |
|---|---|---|---|---|
| 4,014,603 | A * | 3/1977 | Moraw | G03H 1/265 |
| | | | | 359/6 |
| 5,369,511 | A * | 11/1994 | Amos | G02B 19/009 |
| | | | | 359/107 |
| 5,377,291 | A * | 12/1994 | Hatakoshi | G02B 6/34 |
| | | | | 359/332 |
| 6,980,337 | B2 * | 12/2005 | Roh | G03H 1/04 |

\* cited by examiner

APPARATUS AND METHOD FOR MANUFACTURING RADIAL OR AZIMUTHAL POLARIZATION CONVERSION COMPONENT

FIELD OF THE INVENTION

The present invention relates to a grating structure, and more particularly to an apparatus and a method for manufacturing a radial or azimuthal polarization conversion component.

BACKGROUND OF THE INVENTION

For some equipment such as laser cutting or optical microscopes, the light needs to be highly focused in one place to get good working achievement. However, because light has wave properties, it will produce diffraction during the travel of the medium, that is, it will deviate from its straight traveling direction. If the light cannot be concentrated, it is difficult to meet the requirements of high-precision work.

After a radially polarized laser light source with axial symmetry is focused by a lens with high numerical aperture, a large longitudinal electric field component is generated at the focused point to form a focused light spot beyond the diffraction limit, so it attracts considerable attention in laser light applications. In these years, there are many related research and applications, such as optical manipulation, plasmonic lenses, Raman spectroscopy, photothermal therapy, and particle accelerators.

Therefore, how to convert linearly or circularly polarized light into radially polarized light is an important issue. For example, a special optical component such as axicon or non-periodic subwavelength grating is placed in a laser resonant cavity to obtain radially polarized light by superimposing different modes of laser light; or incident linearly or circularly polarized light is converted to radially polarized light by combining a half-wave plate or using a spatial light modulator. However, the above conversion methods all have the problems of stability of the light source, the difficulty of light collimation and high power loss of the system.

SUMMARY OF THE INVENTION

The primary object of the present invention is to provide an apparatus and a method for manufacturing a radial or azimuthal polarization conversion component, which allows a light beam to pass through a reflector having a truncated cone shape. The central light beam and the reflected beam reflected by the reflector interfere with each other to generate interference fringes on the holographic recording material, having the effect of completing a radial or azimuthal polarization volume hologram quickly.

In order to achieve the above object, the present invention provides an apparatus for manufacturing a radial or azimuthal polarization conversion component, comprising a reflector having a truncated cone shape and a holographic recording material having a thickness d. The reflector has a top portion, a bottom portion, and a circumferential portion connected between the top portion and the bottom portion. The holographic recording material is attached to the bottom portion of the reflector. The top portion has a width L. The bottom portion has a width D. A height H is defined from the top portion to the bottom portion. An angle $\theta_{i1}$ is defined between the circumferential portion and the top portion. When a light beam is incident vertically from above, a part of the light beam vertically passes through the top portion to the bottom portion, another part of the light beam enters the circumferential portion at an incident angle $\theta_{i1}$ and forms a reflected light beam to enter the bottom portion at an incident angle $\theta_{i2}$, the reflected light enters the holographic recording material at a refraction angle $\theta_{r2}$ to generate an exposure range with a radius R on the holographic recording material;

$$L = [2R(1 + \cos\theta_{i1})] + 2d\tan\theta_{r2};$$
$$D = 2R + 2(d\tan\theta_{r2});$$
$$H = \left(\frac{L-D}{2}\right) \cdot \tan\theta_{i1}.$$

In an embodiment, the reflector is a prism.

A method for manufacturing a holographic radial or azimuthal polarization conversion component, comprises the steps of:

attaching a holographic recording material having a thickness d to a bottom portion of a reflector, wherein the reflector has a top portion, the bottom portion and a circumferential portion connected between the top portion and the bottom portion, the top portion has a width L, the bottom portion has a width D, a height H is defined from the top portion to the bottom portion, an angle $\theta_{i1}$, is defined between the circumferential portion and the top portion; wherein when a light beam is incident vertically from the top portion of the reflector, a part of the light beam vertically passes through the top portion to the bottom portion, another part of the light beam enters the circumferential portion at an incident angle $\theta_{i1}$ and forms a reflected light beam to enter the bottom portion at an incident angle $\theta_{i2}$, the reflected light enters the holographic recording material at a refraction angle $\theta_{r2}$ to generate an exposure range with a radius R on the holographic recording material;

$$L = [2R(1 + \cos\theta_{i1})] + 2d\tan\theta_{r2};$$
$$D = 2R + 2(d\tan\theta_{r2});$$
$$H = \left(\frac{L-D}{2}\right) \cdot \tan\theta_{i1}.$$

allowing a light beam to be incident vertically from the top portion of the reflector and reflected by the circumferential portion to enter the holographic recording material.

Preferably, the light beam is linearly polarized, circularly polarized, or elliptically polarized light.

DETAILED DESCRIPTION OF THE PREFERRED EMBODIMENTS

Figure 1:
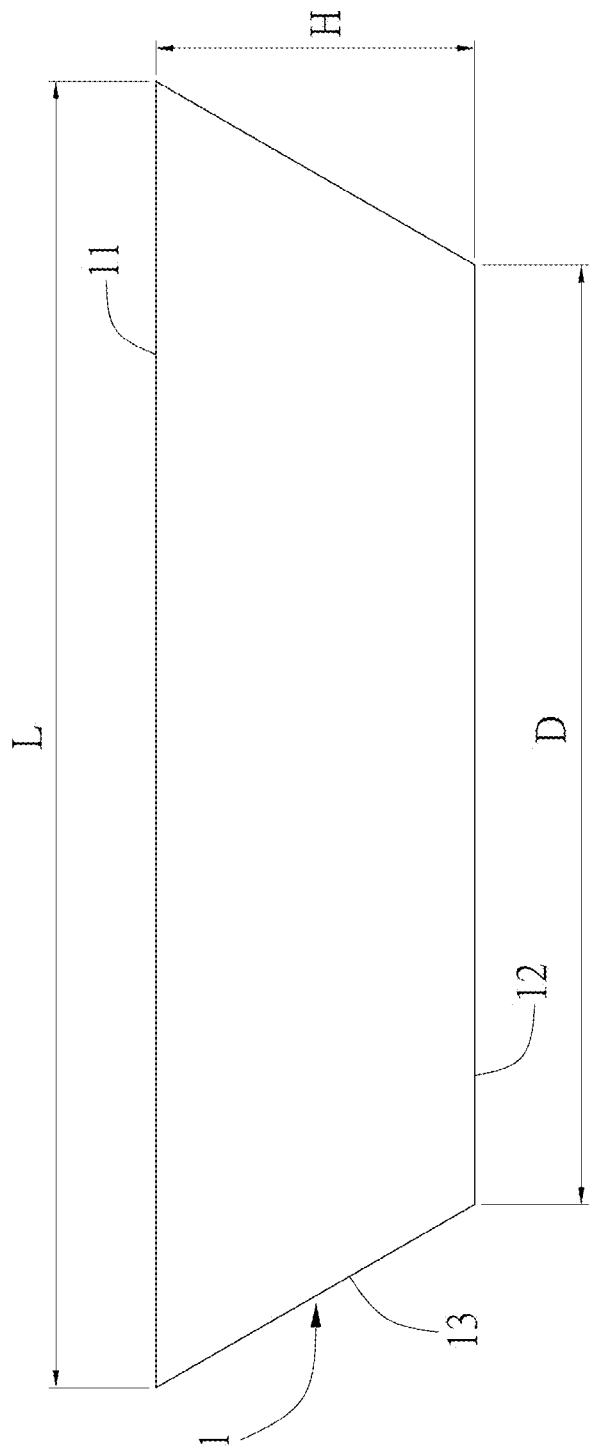
FIG. 1 is a schematic planar view of a first embodiment of the manufacturing apparatus of the present invention.

FIG. 1 illustrates an apparatus for manufacturing a radial or azimuthal polarization conversion component provided by the present invention, comprising a reflector 1 having a truncated cone shape. In this embodiment, the reflector 1 is a prism, defining a top portion 11, a bottom portion 12 and a circumferential portion 13 connected between the top portion 11 and the bottom portion 12. The width of the top portion 11 is L. The width of the bottom portion 12 is D. The height from the top portion 11 to the bottom portion 12 is H. The angle between the circumferential portion 13 and the top portion 11 is $\theta_{i1}$. A holographic recording material 2 is attached to the bottom portion 12 of the reflector 1.

Figure 2:
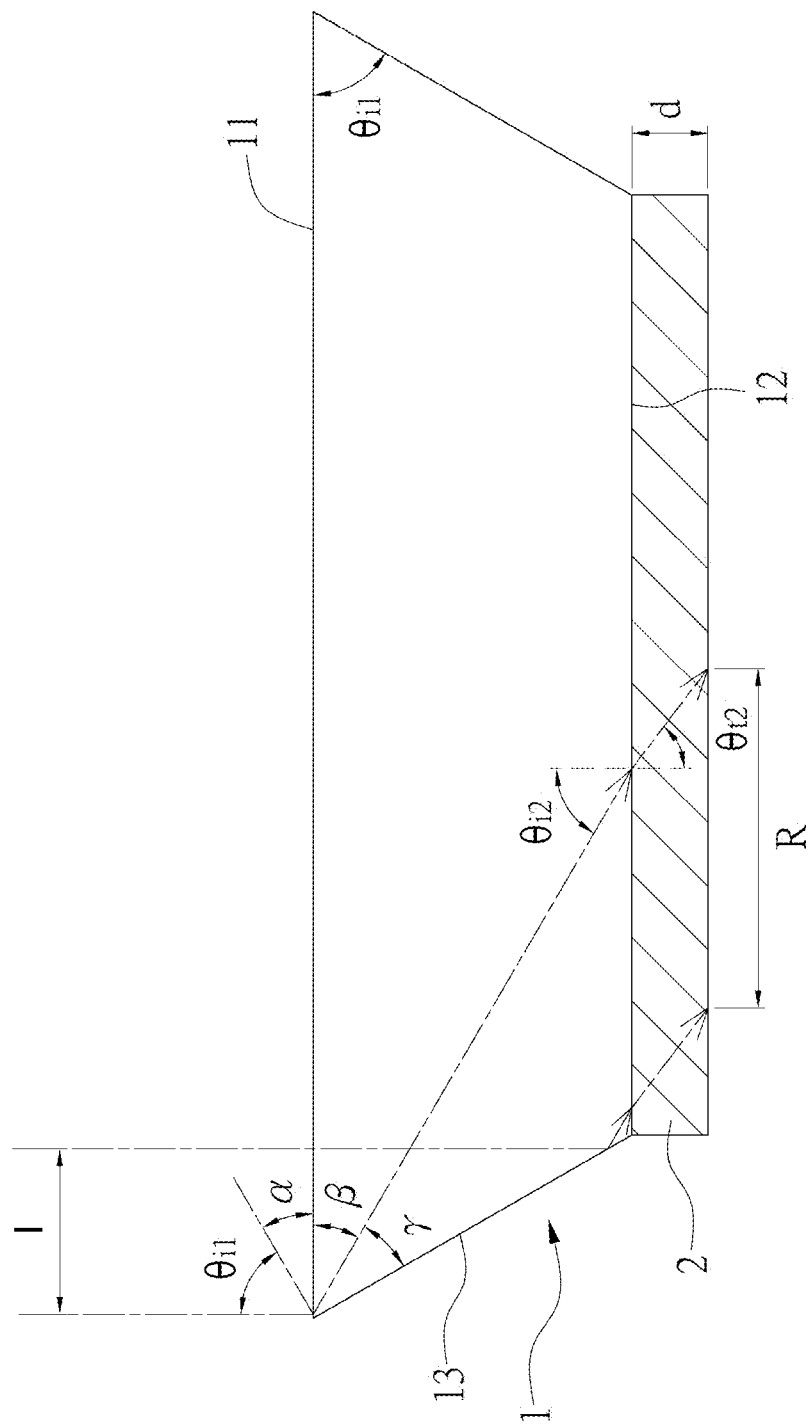
FIG. 2 is a schematic view of the process of manufacturing the radial or azimuthal polarization conversion component according to the present invention.

As shown in FIG. 2, the reflector 1 is disposed on the holographic recording material 2 having a thickness d. When a light beam is incident vertically from the top portion 11 of the reflector 1, a part of the light beam vertically passes through the central area of the reflector 1 from the top portion 11 to the bottom portion 12, and another part of the light beam is reflected by the circumferential portion 13. The light beam reflected by the circumferential portion 13 first enters the circumferential portion 13 at an incident angle $\theta_{i1}$, and then forms a reflected light beam. The reflected light enters the bottom portion 12 at an incident angle $\theta_{i2}$, and then enters the holographic recording material 2 at a refraction angle $\theta_{r2}$ to generate an exposure range with a radius R on the holographic recording material 2. In this embodiment, the light beam is linearly polarized, circularly polarized, or elliptically polarized light.

Under the premise that the refractive index $n_a$ of air, the refractive index $n_g$ of the prism and the refractive index $n_{f1}$ of the holographic recording material are known, the refraction angle of the light beam in the holographic recording material is obtained by Snell's law as $$\theta_{r2} = \sin^{-1}\left(\frac{n_g}{n_{f1}} \cdot \sin\theta_{i2}\right) \quad (A)$$

According to the geometric relationship, the following formulas are obtained:

$$\alpha + \beta = \theta_{i1}$$

$$\alpha + \beta + \gamma = \frac{\pi}{2}$$

$$\beta = \frac{\pi}{2} - \theta_{i2}$$

$$\alpha + \theta_{i1} = \frac{\pi}{2}$$

It is obtained by rearranging the above four formulas:

$$\gamma = \left(\frac{\pi}{2} - \theta_{i1}\right)$$

$$\theta_{i2} = (\pi - 2\theta_{i1}).$$

It is obtained by substituting back to the formula (A):

$$\theta_{r2} = \sin^{-1}\left[\frac{n_g}{n_{f1}} \cdot \sin(\pi - 2\theta_{i1})\right]$$

Then, according to the geometric relationship, the following formulas are obtained:

$$\sin\theta = \frac{H}{R}$$

$$\cos\theta = \frac{l}{R}$$

$$\tan\theta = \frac{H}{l} = \frac{H}{\left(\frac{L-D}{2}\right)}$$

Assuming that the diameter of the incident light beam is equal to the width L of the top portion of the reflector, it is obtained as below:

$$L = 2R + 2l + 2(d \tan\theta_{r2}) = [2R(1+\cos\theta_{i1})] + 2d \tan\theta_{r2}$$

The width D of the bottom portion of the reflector is denoted as:

$$D = 2R + 2(d \tan\theta_{r2})$$

The height H from the top portion to the bottom portion of the reflector is denoted as:

$$H = \left(\frac{L-D}{2}\right) \cdot \tan\theta_{i1}.$$

According—to the aforementioned formulas, the specification of the reflector can be calculated under the conditions of known relevant parameters. For example, assuming that the thickness d of the holographic recording material 2 is 16 μm, the exposure range R is 10 mm, the incident angle $\theta_{i1}$ of the light beam entering the circumferential portion 13 of the reflector is 66.5° and the refraction angle $\theta_{r2}$ of the light beam in the holographic recording material 2 is 48.2°, the specification of the reflector 1 can be calculated from the formulas: the width of the top portion 11 is 28.01 mm, the width of the bottom portion 12 is 20.02 mm, and the height from the top portion to the bottom portion of the reflector is 9.19 mm.

With the above reflector, when the reflector 1 is irradiated with a construction light, a part of the light beam passes vertically from the top portion to the bottom portion, and another part of the light beam is reflected by the circumferential portion to the holographic recording material 2. Thus, the interference phenomenon is generated and the construction is carried out, that is, the holographic recording material 2 is made into a radial or azimuthal polarization conversion component.

Figure 3:
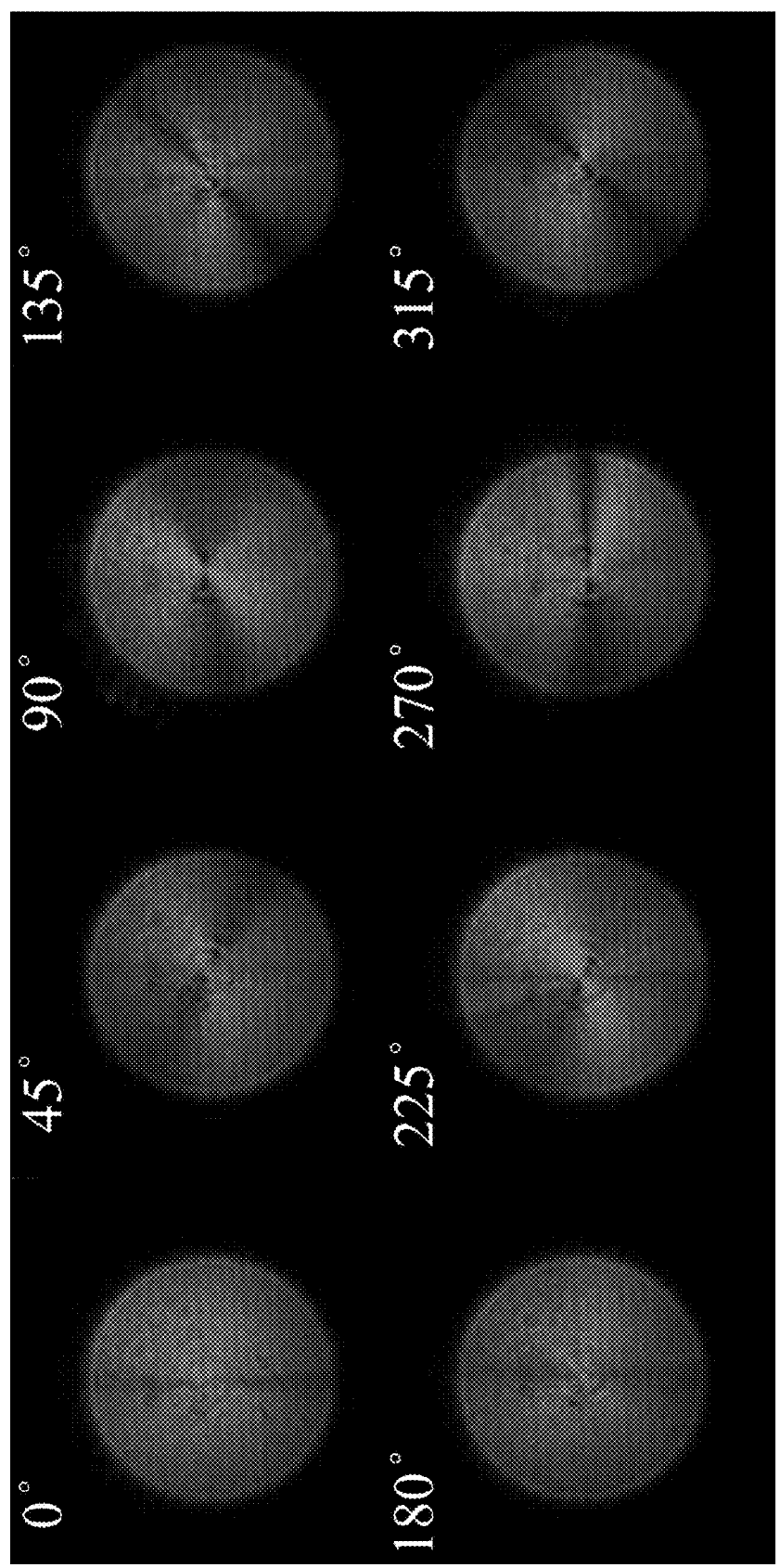
FIG. 3 is a diagram showing the light intensity distribution of the finished product of the present invention.

In order to detect whether the radial or azimuthal polarization conversion component manufactured by the method of the present invention has the effect, a 45° linearly polarized red laser with a wavelength of 633 nm serves as the test light source to pass through a half-wave plate and a quarter-wave plate in sequence. The red laser is converted into a circularly polarized light beam to be incident on the radial or azimuthal polarization conversion component made of the holographic recording material. After the azimuth of the transmission axis of the analyzer is adjusted to 0°, 45°, 90°, 135°, 180°, 225°, 270° and 315° respectively, referring to FIG. 3 illustrating the light intensity distribution, the light-field intensity of the sector-shaped sub-areas corresponding to the four different transmission axes of 0°-180°, 45°-225°, 90°-270° and 135°-315° is indeed stronger than that of the other areas. It can be seen that the present invention can indeed be made into a holographic radial or azimuthal polarization conversion component.

Figure 4:
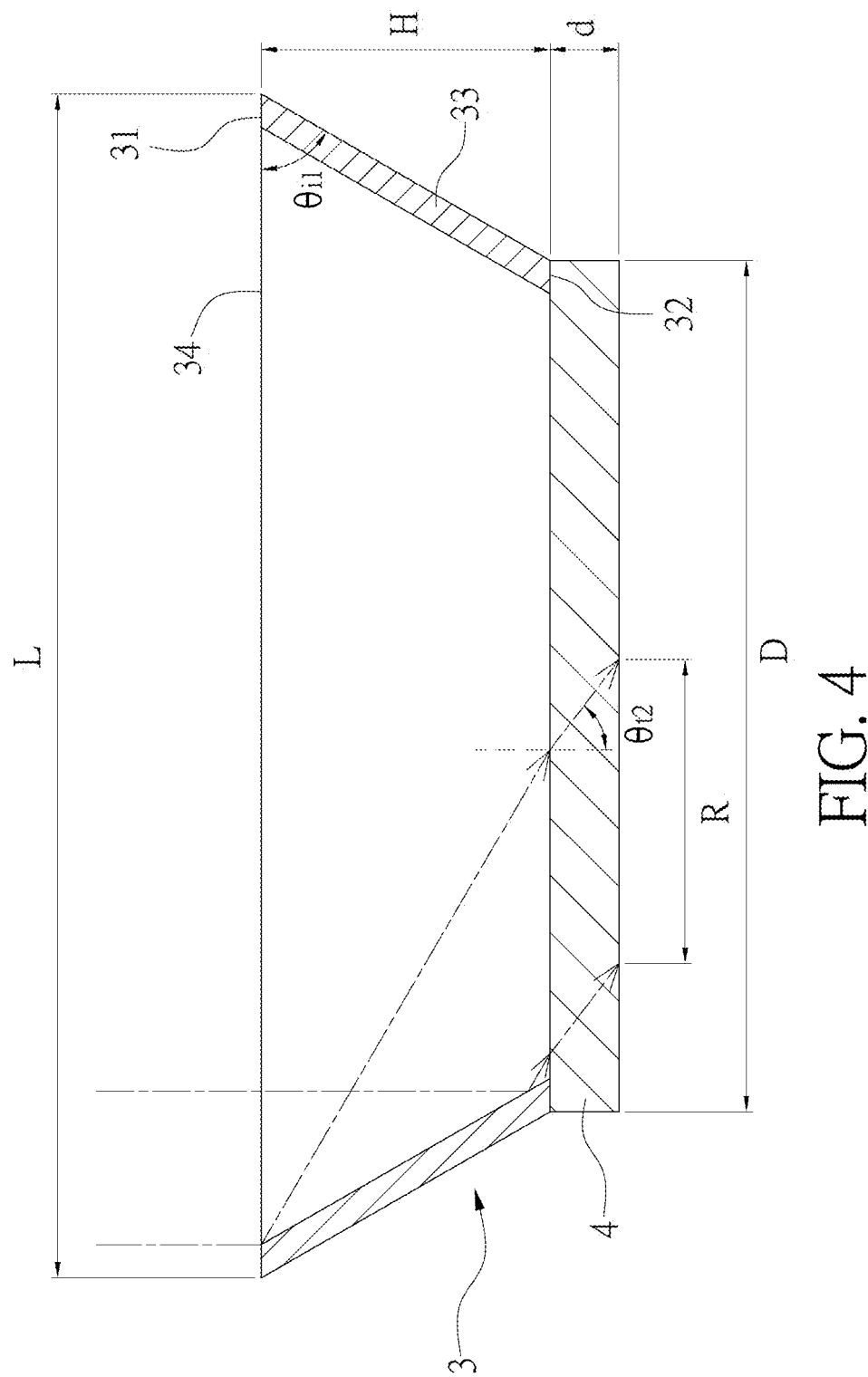
FIG. 4 is a schematic planar view of a second embodiment of the manufacturing apparatus of the present invention.

Furthermore, since the present invention utilizes the characteristic of the mutual interference of the two light beams caused by the shape of the reflector when the light beam passes through the reflector, a second embodiment of the present invention is shown in FIG. 4.

In the second embodiment, the reflector 3 defines a circumferential portion 33 surrounding a hollow area, a top portion 31 at its top end and a bottom portion 32 at its bottom end. A holographic recording material 4 having a thickness d is attached to the bottom portion 32 of the reflector 3. The width of the top portion 31 is L. The width of the bottom portion 32 is D. The height from the top portion 31 to the bottom portion 32 is H. The angle between the circumferential portion 33 and a horizontal plane 34 is $\theta_{i1}$. When the light beam is vertically incident from above, similar to the first embodiment, a part of the light beam vertically passes though the hollow area of the reflector 3 from the top portion 31 to the bottom portion 32, and another part of the light beam is reflected by the circumferential portion 33 to enter the holographic recording material 4 at a refraction angle $\theta_{t2}$ to generate an exposure range with a radius R on the holographic recording material 4.

With the structure of this embodiment, like the first embodiment, the light beam is divided into two light beams interfering with each other to generate interference fringes in the holographic recording material 4, having the same effect as the first embodiment.

What is claimed is:

1. An apparatus for manufacturing a radial or azimuthal polarization conversion component, disposed on a holographic recording material having a thickness d, comprising:
   a reflector having a truncated cone shape, having a top portion, a bottom portion and a circumferential portion connected between the top portion and the bottom portion, the top portion having a width L, the bottom portion having a width D, a height H being defined from the top portion to the bottom portion, an angle $\theta_{i1}$ being defined between the circumferential portion and the top portion;
   wherein when a light beam is incident vertically from above, a part of the light beam vertically passes through the top portion to the bottom portion, another part of the light beam enters the circumferential portion at an incident angle $\theta_{i1}$ and forms a reflected light beam to enter the bottom portion at an incident angle $\theta_{i2}$, the reflected light enters the holographic recording material at a refraction angle $\theta_{t2}$ to generate an exposure range with a radius R on the holographic recording material;

$$L = [2R(1 + \cos\theta_{i1})] + 2d\tan\theta_{t2};$$

$$D = 2R + 2(d\tan\theta_{t2});$$

$$H = \left(\frac{L-D}{2}\right) \cdot \tan\theta_{i1}.$$

2. The apparatus as claimed in claim 1, wherein the reflector is a prism.

3. The apparatus as claimed in claim 1, wherein the reflector is a hollow structure surrounded with a sheet.

4. A method for manufacturing a holographic radial or azimuthal polarization conversion component, comprising the steps of:
   attaching a holographic recording material having a thickness d to a bottom portion of a reflector, wherein the reflector has a top portion, the bottom portion and a circumferential portion connected between the top portion and the bottom portion, the top portion has a width L, the bottom portion has a width D, a height H is defined from the top portion to the bottom portion, an angle $\theta_{i1}$ is defined between the circumferential portion and the top portion; wherein when a light beam is incident vertically from the top portion of the reflector, a part of the light beam vertically passes through the top portion to the bottom portion, another part of the light beam enters the circumferential portion at an incident angle $\theta_{i1}$ and forms a reflected light beam to enter the bottom portion at an incident angle $\theta_{i2}$, the reflected light enters the holographic recording material at a refraction angle $\theta_{t2}$ to generate an exposure range with a radius R on the holographic recording material;

$$L = [2R(1 + \cos\theta_{i1})] + 2d\tan\theta_{t2};$$

$$D = 2R + 2(d\tan\theta_{t2});$$

$$H = \left(\frac{L-D}{2}\right) \cdot \tan\theta_{i1}.$$

allowing a light beam to enter the holographic recording material at normal incidence from the top portion of the reflector and another light beam to enter the holographic recording material after being reflected by the circumferential portion, the two light beams interfering in the holographic recording material.

5. The method as claimed in claim 4, wherein the light beam is linearly polarized, circularly polarized, or elliptically polarized light.

6. The method as claimed in claim 4, wherein the reflector is a prism.

* * * * *